United States Patent [19]

Koshizawa et al.

[11] Patent Number: 4,930,594
[45] Date of Patent: Jun. 5, 1990

[54] DEVICE FOR CONTROLLING MOTOR VEHICLE TO RUN AT CONSTANT SPEED

[75] Inventors: Toshifumi Koshizawa, Kawasaki; Satoshi Yamaguchi, Tokyo; Hiroshi Yoshimura, Hiroshima; Youichi Iida, Kawasaki, all of Japan

[73] Assignee: Isuzu Motors Limited, Tokyo, Japan

[21] Appl. No.: 187,541

[22] Filed: Apr. 28, 1988

[30] Foreign Application Priority Data

Apr. 28, 1987 [JP] Japan .................. 62-105980

[51] Int. Cl.⁵ .......................................... B60K 31/04
[52] U.S. Cl. ...................... 180/179; 123/350
[58] Field of Search ............... 180/170, 175, 176, 178, 180/179; 123/350, 349, 351, 352, 340

[56] References Cited

U.S. PATENT DOCUMENTS

| | | | |
|---|---|---|---|
| 3,893,537 | 7/1975 | Sakakibara | 173/102 |
| 4,056,157 | 11/1977 | Kawata | 173/102 |
| 4,359,125 | 11/1982 | Shinoda et al. | 180/179 |
| 4,401,075 | 8/1983 | O'Keefe, Jr. et al. | 180/178 |
| 4,467,428 | 8/1984 | Caldwell | 180/179 |
| 4,516,652 | 5/1985 | Tanigawa et al. | 180/177 |
| 4,537,272 | 8/1985 | Tanigawa et al. | 180/176 |
| 4,660,672 | 4/1987 | Katou | 180/178 |

FOREIGN PATENT DOCUMENTS

| | | |
|---|---|---|
| 0142046 | 5/1985 | European Pat. Off. . |
| 0154029 | 9/1985 | European Pat. Off. . |
| 3010396 | 10/1980 | Fed. Rep. of Germany . |
| 217337 | 1/1985 | Fed. Rep. of Germany . |
| 3535924 | 4/1986 | Fed. Rep. of Germany . |
| 3641629 | 6/1987 | Fed. Rep. of Germany . |
| 60-145430 | 7/1985 | Japan . |
| 2136606 | 9/1984 | United Kingdom . |
| 2141269 | 12/1984 | United Kingdom . |

Primary Examiner—Charles A. Marmor
Assistant Examiner—Richard Comby
Attorney, Agent, or Firm—Staas & Halsey

[57] ABSTRACT

A motor vehicle is controlled to run at a constant speed by calculating a target engine rotational speed based on a preset vehicle speed and a gear position of a transmission, determining an upper limit for the amount of fuel to be supplied to maintain the target engine rotational speed, and controlling the amount of fuel to be supplied below an upper limit based on the difference between the preset vehicle speed and the speed at which the vehicle is running.

11 Claims, 8 Drawing Sheets

DEVICE FOR CONTROLLING MOTOR VEHICLE TO RUN AT CONSTANT SPEED

BACKGROUND OF THE INVENTION

The present invention relates to a device for controlling a motor vehicle to run at a constant speed, and more particularly to a device for controlling a motor vehicle to run at a constant speed while reducing overshoot of vehicle speed at a time of transition when running from an uphill to the running on a flat road.

To maintain a constant speed of travel of a motor vehicle which is continuously running on a flat road or a sloping road, the driver has to adjust the depth to which an accelerator pedal is depressed according to the road conditions. This procedure can be physically and mentally tiresome. There has recently been developed a device, known as a cruise control system, for controlling a motor vehicle to run at a desired constant speed without requiring the driver to depress and adjust the accelerator pedal.

Figure 8:
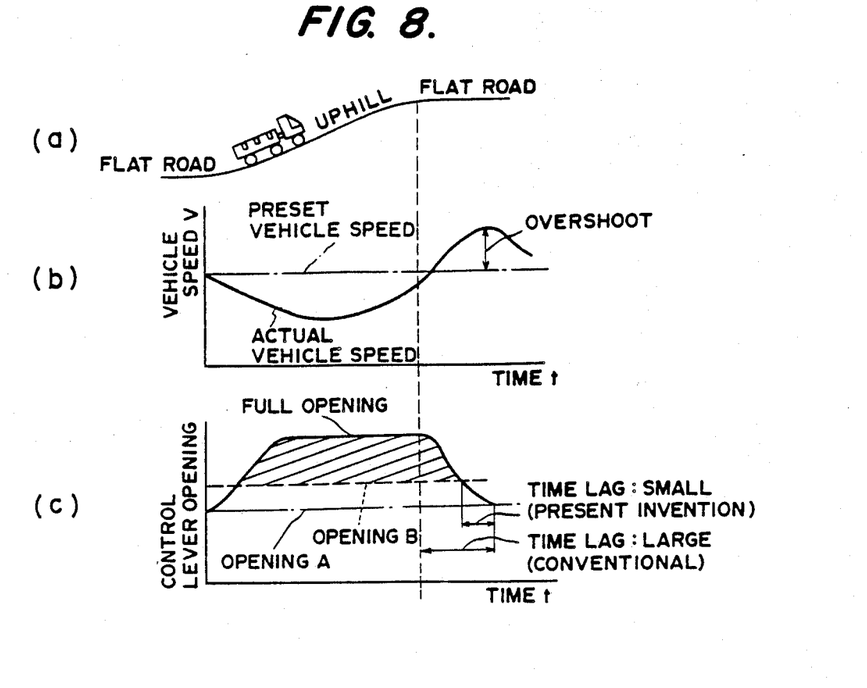
FIGS. 8(a), 8(b), and 8(c) are diagrams explaining the problem of a conventional constant-speed controlling device.

With the conventional constant-speed controlling device, when a large-size motor vehicle of a large inertial mass runs uphill and then on a flat road, as shown in FIG. 8(a) of the accompanying drawings, the actual speed of the motor vehicle overshoots a preset vehicle speed as shown in FIG. 8(c). If such an overshoot is large, the driver and passengers on the vehicle tend to feel uncomfortable, and the motor vehicle tends to shake vertically, causing the load on the motor vehicle to collapse.

Figure 9:
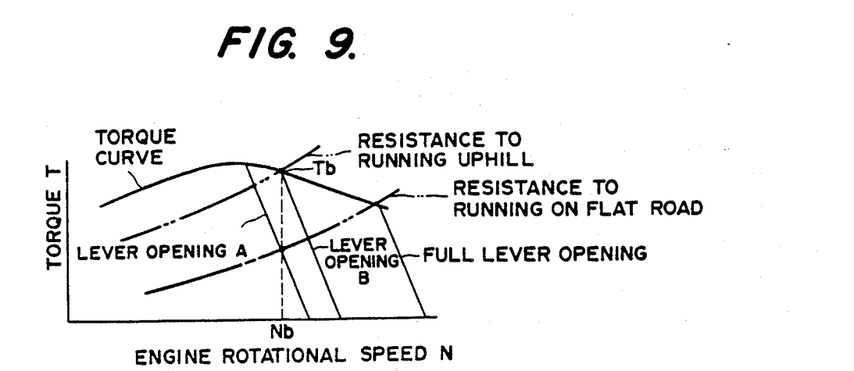
FIG. 9 is a graph showning the relationship between engine rotational speeds and torques.

The problem of overshooting is particularly experienced by a diesel-engine motor vehicle in which an all-speed governor is mounted on a fuel injection pump. The reason for an increased amount of overshoot on such a motor vehicle in a constant-speed running mode is shown in FIG. 8(c). While running uphill, the control lever of the governor is opened to a full-speed position. A large time lag or delay occurrs before the control lever returns to an opening A corresponding to the preset speed when the vehicle runs on a flat road. In a system in which the opening of a governor control lever is subject to proportional plus integral control (PI control) based on a difference between the preset speed and an actual speed, increased overshooting is caused because the period of integral control is increased and a large time lag elapses until the control lever returns to the opening A. More specifically, as shown in FIG. 9, in order for the motor vehicle to run uphill, the opening B is sufficient as the control lever opening which maintains the engine rotational speed Nb at which an engine torque Tb can be produced, (during uphill running, the transmission is in a lower gear position than the gear position in which the vehicle runs on a flat road with the lever opening A). Therefore, the hatched area shown in FIG. 8(c) indicates wasteful motion of the control lever in the conventional constant-speed controlling device.

One proposed device for controlling a motor vehicle to run at constant speed is disclosed in Japanese Laid-Open Patent Publication No. 60-145430. The disclosed device utilizes auxiliary braking provided by the exhaust as a means for reducing speed overshooting of a large-size motor vehicle having a large inertial mass. The disclosed scheme is however not addressed to the elimination of the wasteful motion of the control lever, but to the solution of the problem of overshooting caused by a control lever being opened to the full-speed position by effecting auxiliary braking provided by the exhaust. Therefore, the problems of excessive fuel consumption and a complex mechanism remain to be solved.

SUMMARY OF THE INVENTION

It is an object of the present invention to provide a device for controlling a motor vehicle to run at a constant speed while reducing overshooting of a vehicle speed during a time of constant-speed running.

Another object of the present invention is to provide a device for controlling a motor vehicle to run at a constant speed while improving fuel economy.

According to the present invention, there is provided a constant-speed controlling device for controlling a vehicle to run at a constant speed, including an electronic controller for controlling a device for supplying fuel to the vehicle engine, based on a difference between the preset constant speed at which the motor vehicle is to run and a speed at which the motor vehicle is running. The constant-speed controlling device comprises means for detecting the speed at which the motor vehicle is running, means for setting the preset constant speed at which the motor speed is to run, means for calculating a target engine rotational speed based on the preset speed and the vehicle gear position of a transmission while the motor vehicle is running, means for calculating an upper limit for the amount of fuel to be supplied for maintaining the target engine rotational speed, and means for controlling the amount of fuel to be supplied below the upper limit based on the preset speed and the speed at which the motor vehicle is running.

According to the present invention, there is also provided a constant-speed controlling device for controlling a vehicle to run at a constant speed, including an electronic controller for controlling a device for supplying fuel to the vehicle engine, based on a difference between a preset constant speed at which the motor vehicle is to run and a speed at which the motor vehicle is running. The constant-speed controlling device comprises means for detecting the speed at which the motor vehicle is running, means for setting the preset constant speed at which the motor speed is to run, means for calculating a target engine rotational speed based on the preset speed and the vehicle gear position a tranmisison of while the motor vehicle is running, means for calculating an upper limit for the amount of fuel to be supplied for maintaining the target engine rotational speed, proportional plus integral control means for calculating the amount of fuel to be supplied based on the preset speed and the speed at which the motor vehicle is running, and means for interrupting integral control of the proportional plus integral control means when the calculated amount of fuel to be supplied becomes greater than the upper limit.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
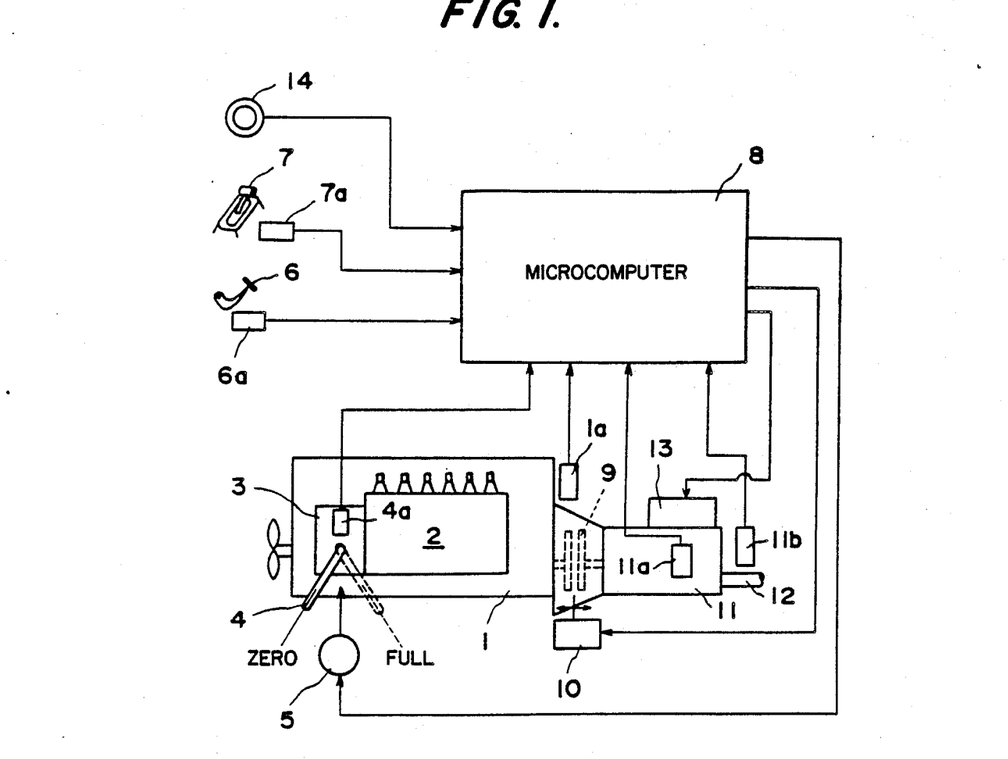
FIG. 1 is a block diagram of a constant-speed controlling device for a motor vehicle according to an embodiment of the present invention.

As shown in FIG. 1, an engine 1 is supplied with fuel from a fuel injection pump 2 serving as a fuel supply device and controlled by a governor (all-speed governor) 3 which is controlled by a control lever 4. The control lever 4 can be actuated by a step motor 5 for varying its opening from a zero-speed position indicated by the solid line to a full-speed position indicated by the broken line. The opening of the control lever 4 can be controlled by the step motor 5 dependent on the depth to which an accelerator pedal 6 is depressed. Denoted at 7 is a gear selector lever or shift lever. An electronic controller 8 comprising a microcomputer or the like includes a memory for storing a normal transmission control program for determining an optimum transmission gear position from a vehicle speed and the amount of depression of the accelerator pedal 6, a clutch control program for controlling a clutch during transmission control, a program for a constant-speed controlling device, and other programs required for vehicle running, a control unit for executing these programs, and an input/output circuit.

A friction clutch 9 is selectively engaged and disengaged by a clutch actuator 10. A normally meshing transmission 11 has an output shaft 12 and is operated for shifting and selecting by a transmission actuator 13. The rotational speed of the engine 1 is detected by an engine rotation sensor 1a. The opening of the control lever 4 is detected by a lever opening sensor 4a. The amount of depression of the accelerator pedal 6 is detected by a depression sensor 6a. The select position of the selector lever 7 is detected by a select position sensor 7a. The gear position of the transmission 11 is detected by a gear position sensor 11a. The vehicle speed is detected by a vehicle speed sensor 11b from the rotational speed of the output shaft 12 of the transmission 11. A desired vehicle speed can be set in a constant-speed mode by a set switch 14. Output signals from these sensors and the set switch 14 are applied to the electronic controller 8, which then produces output signals to automatically control the step motor 5, the clutch actuator 10, and the transmission actuator 13 dependent on the running conditions of the vehicle. The electronic controller 8 stores data on the total displacement of the engine, the final drive ratio, the weights of the vehicle (when loaded and not loaded), the tire radius, the transmission gear ratios, etc.

Figure 2:
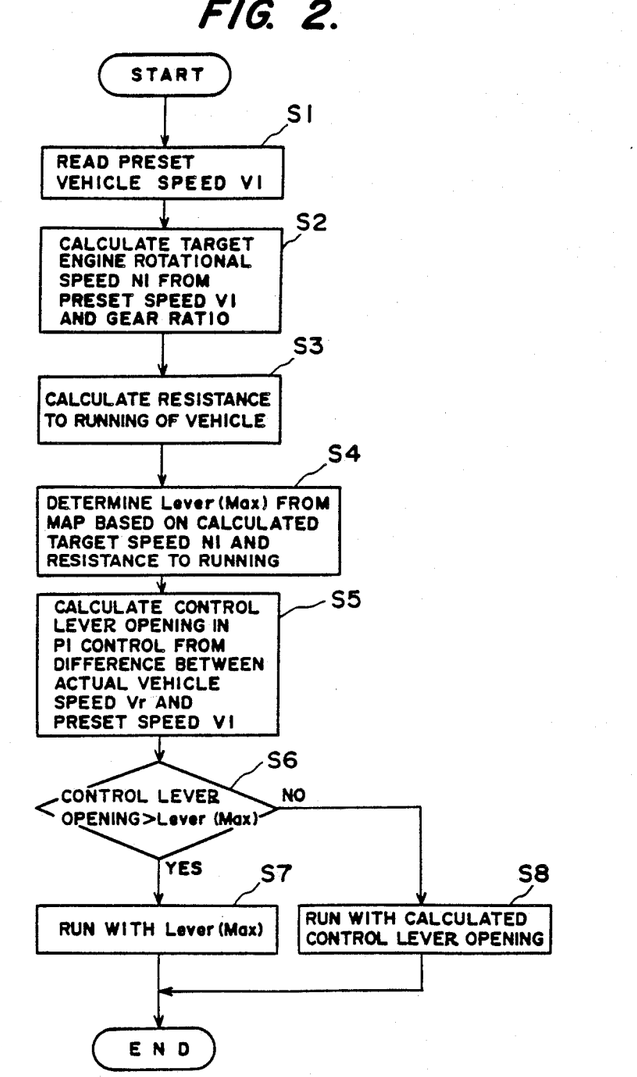
FIG. 2 is a flowchart of an operation sequence of the constant-speed controlling device shown FIG. 1.

Operation of the constant-speed controlling device according to the present invention will be described with reference to the flowchart of FIG. 2.

In a step S1, a preset vehicle speed V1 set by the set switch 14 is read into a memory in the electronic controller 8. A target engine rotational speed N1 is calculated from the preset vehicle speed V1 and the gear ratio at the present gear position of the transmission 11 in a step S2. Then, the resistance to the running of the vehicle is calculated in a step S3 from the rate of change of the engine rotational speed by the following equation, for example:

Resistance to running = Engine output − Force used for acceleration/deceleration The above equation can be expressed, using the shaft average effective pressure of the engine, as follows:

$$Pmer = Pme - K \times \frac{W}{Vs} \times \left(\frac{R}{\mu f}\right)^2 \times \left(\frac{1}{\mu ti}\right)^2 \times \frac{\Delta Ne}{\Delta t}$$

where

Pmer: the shaft average effective pressure of the engine (engine output),
K: a constant,
Vs: the total displacement of the engine,
W: the weight of the vehicle,
R: the tire radius,
$\mu f$: the final drive ratio,
$\mu ti$: the transmission gear ratio, and
$\Delta Ne/\Delta t$: the change in the engine rotational speed in a time $\Delta t$.

Figure 7:
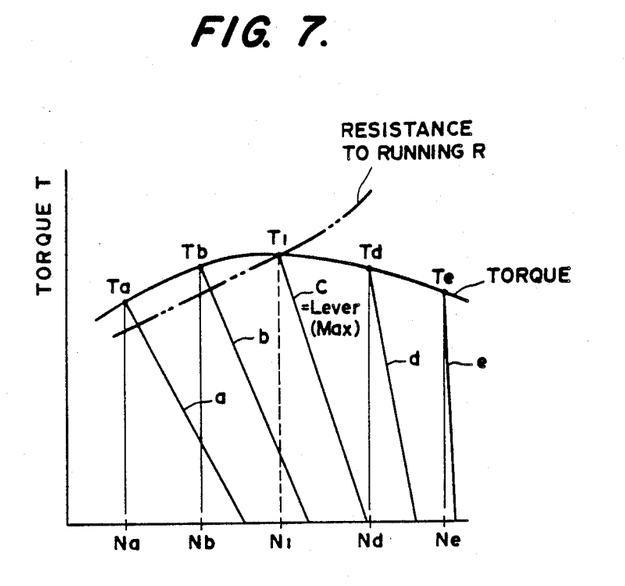
FIG. 7 is a graph explaining how an upper limit for control lever opening is determined.

As shown in FIG. 7, the target engine rotational speed N1 is an engine rotational speed at which a torque T1 is produced that can generate a driving force for overcoming the resistance R to the running of the vehicle. Optimum target engine rotational speeds (e.g., Na–Ne) for the respective gear positions of the transmission are calculated. Then, an upper limit control lever opening Lever (Max) capable of keeping the target engine rotational speed N1 is determined in a step S4. In FIG. 7, assuming that the present resistance to the running of the vehicle is R, the target engine rotational speed N1 can be kept at the control lever openings c, d, and e. The lower limit lever opening c which gives a minimum amount of fuel to be supplied is determined from a map as the upper limit control lever opening Lever (Max) which serves as the upper limit for the amount of fuel to be supplied. In a next step S5, the control lever opening is calculated by proportional plus integral control (PI control) from the difference between the actual vehicle speed Vr and the preset vehicle speed V1. The control lever opening thus calculated and the upper limit control lever opening Lever (Max) are then compared in a step S6. If the calculated control lever opening is larger than Lever (Max), i.e., if YES, then the vehicle is controlled to run with the upper limit control lever opening Lever (Max) in a step S7. If the calculated control lever opening is smaller than Lever (Max), i.e., if NO, then the vehicle is controlled to run with the calculated control lever opening in a step S8. The control lever opening is thus controlled to be smaller than the upper limit, i.e., Lever (Max).

Figure 3:
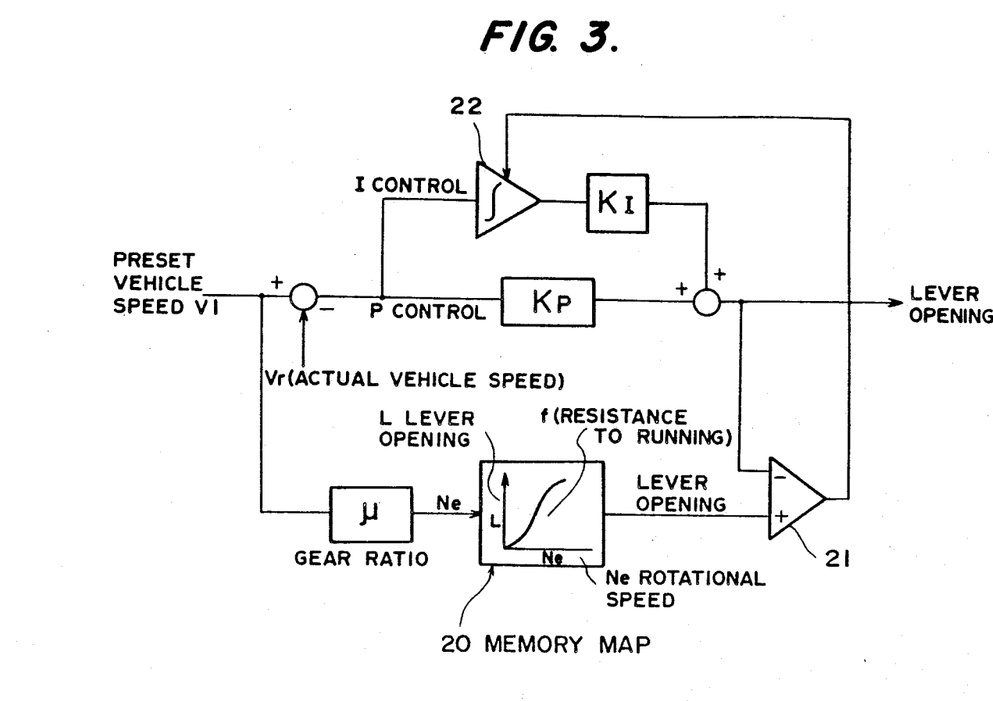
FIG. 3 is a block diagram of a constant-speed controlling device for a motor vehicle according to another embodiment of the present invention.
Figure 4:
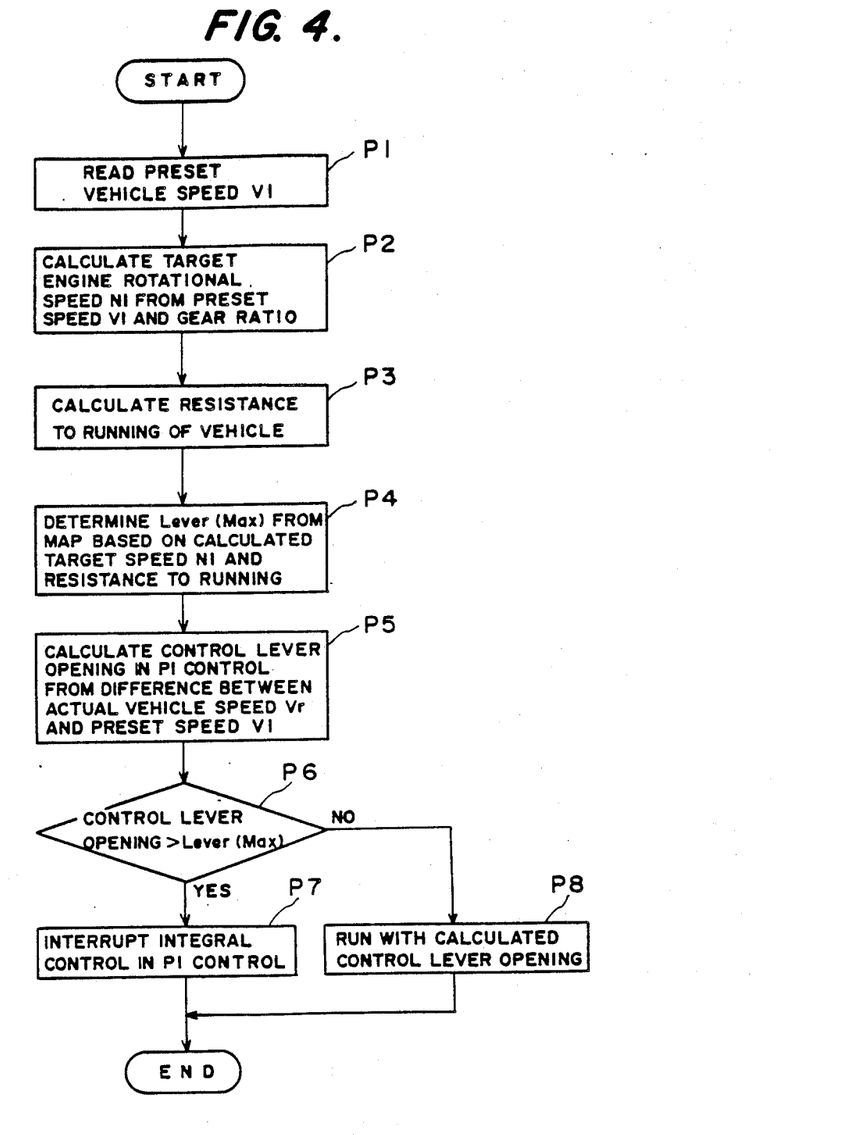
FIG. 4 is a flowchart of an operation sequence of the constant-speed controlling device shown in FIG. 3.

FIGS. 3 and 4 illustrate another embodiment of the present invention.

In the flowchart of FIG. 4, a preset vehicle speed V1 by the set switch 14 is read in a step P1. A target engine rotational speed N1 is calculated in a step P2 from the preset vehicle speed V1 and the gear ratio at the present gear position of the transmission 11 and the resistance to the running of the vehicle is calculated in a step P3. These steps P1, P2, P3 are the same as the steps S1, S2, S3, respectively, in the flowchart of FIG. 2. Then, an upper limit control lever opening Lever (Max) capable of keeping the target engine rotational speed N1 is determined in a step P4.

In FIG. 7, assuming that the present resistance to the running of the vehicle is R, the target engine rotational speed N1 can be kept at the control lever openings c, d, and e. The lower limit lever opening c is determined from a map 20 shown in FIG. 3 as the upper limit control-lever opening Lever (Max). In a next step P5, the control lever opening is calculated by PI control from the difference between the actual vehicle speed Vr and the preset vehicle speed V1. The control lever opening thus calculated and the upper limit control lever opening Lever (Max) are then compared in a step P6. If the calculated control lever opening is larger than Lever (Max), i.e., if YES, then integral control in the PI control is interrupted in a step P7, and the vehicle is controlled by the control lever based on a PI control signal produced while the integral control is being interrupted. More specifically, as shown in FIG. 3, the control lever opening calculated in the PI control and the upper limit control lever opening Lever (Max) determined from the map 20 are compared in a comparator 21. If the control lever opening calculated in the PI control is larger than Lever (Max) from the map, then operation of an integrator 22 for the I control of the PI control is stopped, and the control lever opening is controlled based on the P control signal. Thus, the control lever opening is controlled while limiting the of integral control in the PI control.

If the control lever opening calculated in the PI control is smaller than Lever (Max) from the map in the step P6, then the vehicle is controlled to run with the calculated control lever opening in a step P8.

Figure 5:
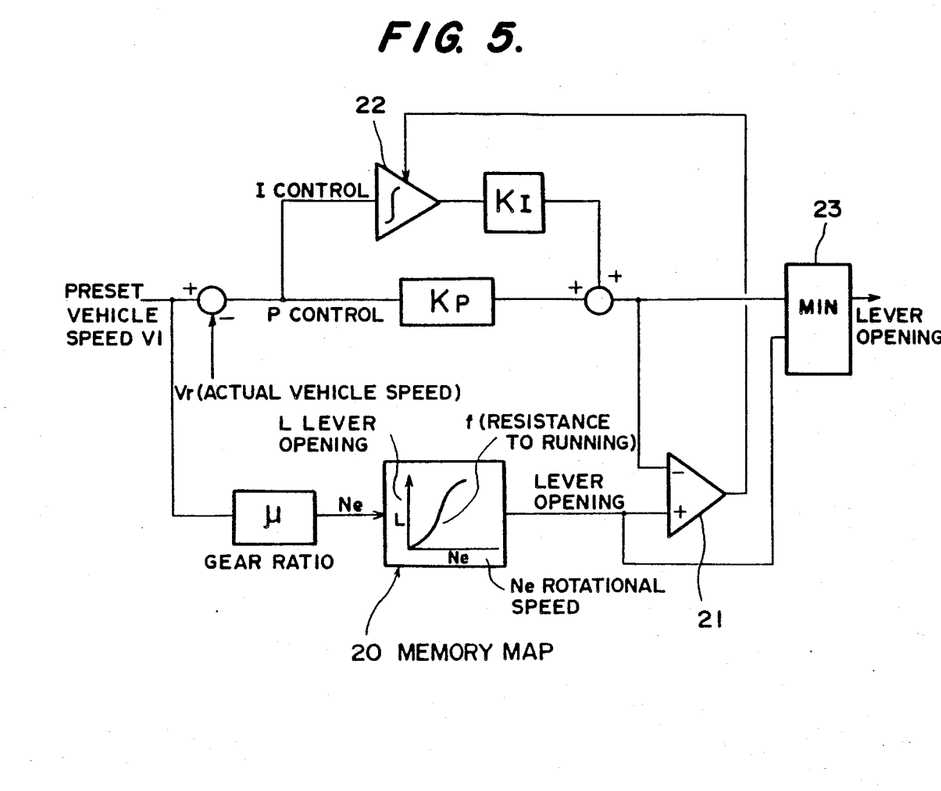
FIG. 5 is a block diagram of a constant-speed controlling device for a motor vehicle according to still another embodiment of the present invention.
Figure 6:
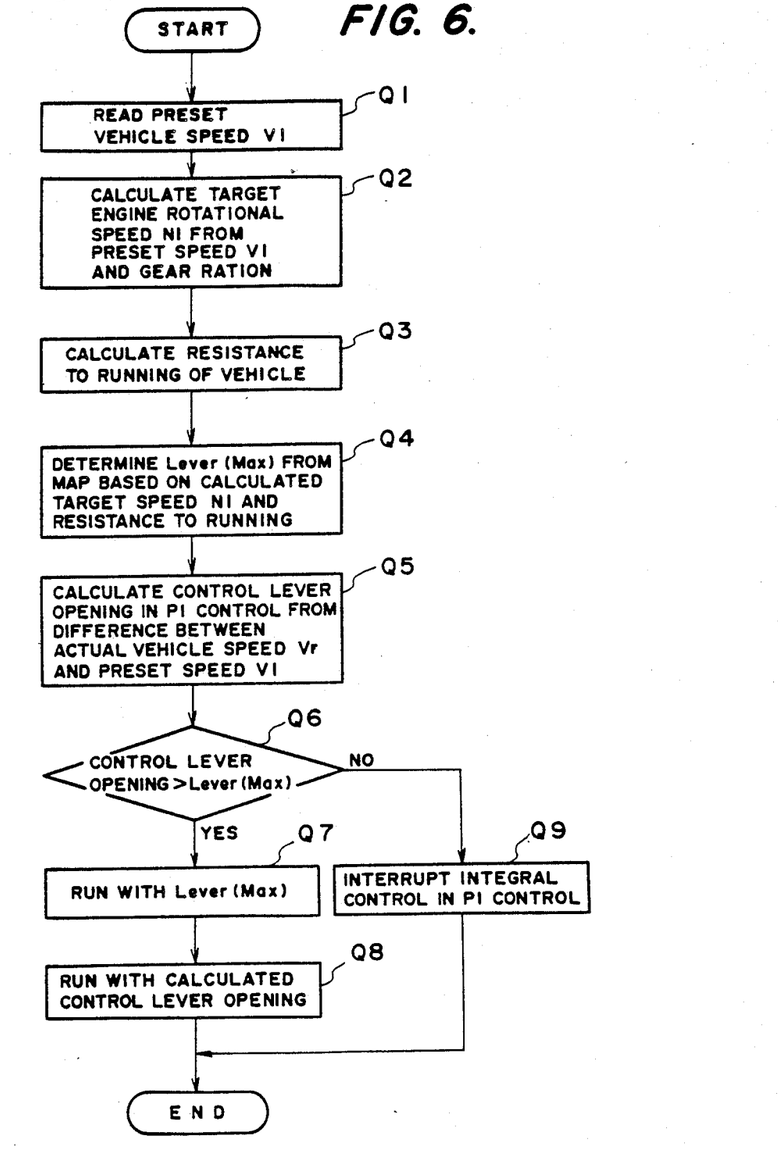
FIG. 6 is a flowchart of an operation sequence of the constant-speed controlling device shown in FIG. 5.

FIGS. 5 and 6 illustrate another embodiment of the present invention.

In the flowchart of FIG. 6, steps Q1, Q2, Q3, Q4, Q5, Q6 are the same as the corresponding steps in the embodiment shown in FIGS. 3 and 4, and will not be described in detail.

In this embodiment, a control lever opening calculated by PI control from the difference between the actual vehicle speed Vr and the preset vehicle speed V1, and an upper limit control lever opening Lever (Max) determined from a map 20 and corresponding to a target engine rotational speed are compared in a control circuit 23 of FIG. 5. The control lever opening is controlled with the smaller value. The control lever opening calculated in the PI control and the upper control lever opening Lever (Max) are compared in a comparator 21. If the calculated control lever opening is larger than the upper control lever opening, then operation of an integrator 22 for the I control is stopped.

More specifically, if the control lever opening calculated in the PI control is larger than the upper control lever opening Lever (Max) in the step Q6 shown in FIG. 6, the vehicle is controlled to run with the upper control lever opening Lever (Max) in a step Q7, and operation of the integrator for the PI control is stopped in a step Q8.

If the control lever opening calculated in the PI control is smaller than the upper limit control lever opening Lever (Max) from the map in the step Q6, then the vehicle is controlled to run with the calculated control lever opening in a step Q9.

With the device according to the present invention, as described above, the opening of the control lever of the governor of the fuel injection pump is limited below a certain upper limit according to running conditions, or the term of integral control in PI control is limited dependent on running conditions. Therefore, the time (time lag or delay) required for the control lever to return upon a transition from running uphill to running on a flat road is shorter than that of a conventional constant-speed controlling device in which the control lever is opened to the full-speed position. Accordingly, overshooting of the speed at the time of vehicle transition from running uphill to running on a flat road is reduced, and fuel economy is improved since the control lever is not opened more than necessary.

Although certain preferred embodiments have been shown and described, it should be understood that many changes and modifications may be made therein without departing from the scope of the appended claims.

What we claim is:

1. A constant-speed controlling device for controlling a motor vehicle having a transmission with a gear position and a preset constant speed at which the motor vehicle is to run, including an electronic controller for controlling a device providing an amount of fuel to an engine of the motor vehicle based on a difference between the preset constant speed at which the motor vehicle is to run and a speed at which the motor vehicle is running, said constant-speed controlling device comprising:

detecting means for detecting the speed at which the motor vehicle is running;

setting means for setting the preset constant speed at which the motor vehicle is to run;

resistance means for determining a resistance to the running of the motor vehicle;

first calculating means for calculating a target engine rotational speed based on the preset constant speed and the gear position of the transmission while the motor vehicle is running;

second calculating means for calculating an upper limit for the amount of fuel provided by the device to maintain the engine at said target engine rotational speed responsive to said target engine rotational speed and said resistance to the running of the motor vehicle; and controlling means for controlling the device providing an amount of fuel, to limit the amount of fuel below said upper limit based on said preset constant speed and said speed at which the motor vehicle is running.

2. A constant-speed controlling device according to claim 1, wherein the device providing an amount of fuel comprises:

a fuel injection pump; and an all-speed governor connected to said fuel injection pump.

3. A constant-speed controlling device according to claim 1, wherein said second calculating means calculates said upper limit on the basis of said target engine rotational speed and a value of resistance to running of the motor vehicle.

4. A constant-speed controlling device for controlling a motor vehicle having a transmission with a gear position and a preset constant speed at which the motor vehicle is to run, including an electronic controller for controlling a device providing an amount of fuel to an engine of the motor vehicle based on a difference between the preset constant speed at which the motor vehicle is to run and a speed at which the motor vehicle is running, said constant-speed controlling device comprising:

detecting means for detecting the speed at which the motor vehicle is running;

setting means for setting the preset constant speed at which the motor vehicle is to run;

first calculating means for calculating a target engine rotational speed based on the preset constant speed and the gear position of the transmission while the motor vehicle is running;

second calculating means for calculating an upper limit for the amount of fuel provided by the device to maintain the engine at said target engine rotational speed;

proportional plus integral control means for providing proportional and integral control of the device providing an amount of fuel and for calculating the amount of fuel provided by the device based on said preset constant speed and said detected speed at which the motor vehicle is running, said calculated amount of fuel comprising a proportional control signal and an integral control signal; and interrupting means for interrupting said integral control signal when said calculated amount of fuel becomes greater than said upper limit.

5. A constant-speed controlling device according to claim 4, wherein the device providing an amount of fuel comprises:

a fuel injection pump; and an all-speed governor connected to said fuel injection pump.

6. A constant-speed controlling device according to claim 4, wherein said second calculating means calculates said upper limit on the basis of said target engine rotational speed and a value of resistance to running of the motor vehicle.

7. A constant-speed controlling device for controlling a motor vehicle having a transmission with a gear position and a preset constant speed at which the motor vehicle is to run, including an electronic controller for controlling a device providing an amount of fuel to an engine of the motor vehicle based on a difference between the preset constant speed at which the motor vehicle is to run and a speed at which the motor vehicle is running, said constant-speed controlling device comprising:

detecting means for detecting the speed at which the motor vehicle is running;

setting means for setting the preset constant speed at which the motor vehicle is to run;

first calculating means for calculating a target engine rotational speed based on said preset constant speed and the gear position of the transmission while the motor vehicle is running;

second calculating means for calculating an upper limit for the amount of fuel provided by the device to maintain the engine at said target engine rotational speed;

proportional plus integral control means for providing proportional and integral control, of the device providing an amount of fuel and for calculating the amount of fuel provided by the device based on said preset constant speed and said detected speed at which the motor vehicle is running, said calculated amount of fuel comprising a proportional control signal and an integral control signal;

comparing means for comparing said calculated amount of fuel and said upper limit and for determining a smaller one of said calculated amount of fuel and said upper limit as the amount of fuel provided by the device to the engine; and interrupting means for interrupting said integral control signal when said calculated amount of fuel becomes greater than said upper limit.

8. A constant-speed controlling device according to claim 7, wherein the device providing an amount of fuel comprises:

a fuel injection pump; and an all-speed governor connected to said fuel injection pump.

9. A constant-speed controlling device according to claim 7, wherein said second calculating means calculates said upper limit on the basis of said target engine rotational speed and a value of resistance to running of the motor vehicle.

10. A speed control device for controlling running speed of a motor vehicle having an engine with an engine rotational speed, a gear ratio at a transmission gear position and a device providing fuel to the engine and a preset vehicle speed, said control device comprising:

means for calculating a target engine rotational speed on the basis of the preset vehicle speed and the gear ratio at the transmission gear position;

means for calculating a resistance to running of the motor vehicle based on a rate change of the engine rotational speed;

means for calculating an upper limit of fuel provided by the device, maintaining said target engine rotational speed, on the basis of said calculated resistance to running and said target rotational speed;

proportional plus integral control means for providing proportional and integral control of the device providing fuel and calculating an amount of fuel on the basis of a difference between the running speed of the vehicle and the preset constant speed; and means for interrupting integral control of said proportional plus integral control means when said calculated amount is greater than said upper limit.

11. A speed control device according to claim 10, further comprising means for controlling the device providing fuel in accordance with said upper limit when said calculated amount is greater than said upper limit.

* * * * *